United States Patent

Nakamura

Patent Number: 5,479,353
Date of Patent: Dec. 26, 1995

[54] SYSTEM FOR CORRECTING TOOL DEFORMATION AMOUNT

[75] Inventor: Minoru Nakamura, Minamitsuru, Japan

[73] Assignee: Fanuc Ltd., Yamanashi, Japan

[21] Appl. No.: 828,971

[22] PCT Filed: Jun. 4, 1991

[86] PCT No.: PCT/JP91/00753

§ 371 Date: Feb. 6, 1992

§ 102(e) Date: Feb. 6, 1992

[87] PCT Pub. No.: WO91/19592

PCT Pub. Date: Dec. 26, 1991

[30] Foreign Application Priority Data

Jun. 20, 1990 [JP] Japan .................. 2-162087

[51] Int. Cl.[6] .................................... G06F 15/46
[52] U.S. Cl. ................... 364/474.17; 364/474.18; 364/474.35
[58] Field of Search .............. 364/474.17, 474.03, 364/474.05, 474.18, 474.16, 474.19, 474.35; 318/572, 632, 634; 83/62.1

[56] References Cited

U.S. PATENT DOCUMENTS

| | | | |
|---|---|---|---|
| 3,811,228 | 5/1974 | Nagashima et al. | 51/49 |
| 4,031,368 | 6/1977 | Colding et al. | 364/474.02 |
| 4,078,195 | 3/1978 | Mathias et al. | 364/148 |
| 4,214,191 | 7/1980 | Watanabe et al. | 318/561 |
| 4,354,404 | 10/1982 | Ramusino | 82/2 D |
| 4,620,281 | 10/1986 | Thompson et al. | 364/474.17 |
| 4,666,352 | 5/1987 | Nagao et al. | 409/153 |
| 4,928,019 | 5/1990 | Tomikawa et al. | 250/561 |
| 5,025,592 | 6/1991 | Yamamori et al. | 51/165.71 |
| 5,097,632 | 3/1990 | Yamamori et al. | 51/165.71 |

FOREIGN PATENT DOCUMENTS

2546315 11/1984 France.
57-138562 8/1982 Japan.

OTHER PUBLICATIONS

P. Muller et al., "CNC-Schleifmaschinensteuerungen mit Fehlerkompensation," ZWF, Zeitschrift fur Wirtshafliche Fertigung, No. 1, Feb. 1990, pp. 86–90, Munchen, DE.

*Primary Examiner*—Roy N. Envall, Jr.
*Assistant Examiner*—Thomas E. Brown
*Attorney, Agent, or Firm*—Staas & Halsey

[57] ABSTRACT

A system for correcting a tool deformation amount by which the amount of deformation of a tool is corrected for machining. A preprocessing arithmetic operation means reads a machining program and supplies machining conditions such as a cutting speed and the like necessary for the calculation of the tool deformation amount, to a tool deformation amount calculation means. The tool deformation amount calculation means reads tool deformation parameters such as the rigidity of the tool and the like from a memory, and calculates the tool deformation amount from these tool deformation parameters and machining conditions. Further, a tool correction means determines a tool correction amount and the tool deformation amount and tool correction amount are added to a movement command to determine an amount of movement, which is interpolated by an interpolation means to determine a tool path. This arrangement enables a more accurate machining.

6 Claims, 2 Drawing Sheets

SYSTEM FOR CORRECTING TOOL DEFORMATION AMOUNT

BACKGROUND OF THE INVENTION

1. Field of the Invention

The present invention relates to a system for correcting a tool deformation amount by which the amount of deformation of a tool is corrected for machining, and more specifically, to a system for correcting an amount of deformation of a tool by which the tool deformation amount is determined from the rigidity and the like of the tool.

2. Description of the Related Art

When a workpiece is machined by a tool, the tool is deformed by a predetermined amount by a cutting reaction force acting thereon, and therefore, a greater machining accuracy can be obtained by correcting this tool deformation amount, even in a numerically controlled machine tool. In general, a tool deformation amount is processed by the operator based on personal experience, together with a tool length correction amount and tool diameter correction amount, and the like.

A problem arises, however, in that although an experienced operator can accurately estimate a tool deformation amount, an operator having little experience cannot do so, and even an experienced operator cannot accurately determine a tool deformation amount when a new workpiece is machined.

As is well known, a tool deformation amount can be accurately determined by using a method of a trial cutting of a workpiece, but much time is lost if a trial cutting must be carried out every time, and further when an expensive workpiece is involved, the trial cutting is undesirable

SUMMARY OF THE INVENTION

Taking the above into consideration, an object of the present invention is to provide a tool deformation amount correction system by which a tool deformation amount can be accurately determined to thereby carry out an accurate machining.

To attain the above object, according to the present invention, there is provided a system for correcting a tool deformation amount by which the amount of deformation of a tool is corrected for machining, which comprises a memory for storing tool deformation parameters for calculating a tool deformation amount, a preprocessing arithmetic operation means for reading a machining program and outputting machining conditions, a tool deformation amount calculation means for determining the tool deformation amount from the tool deformation parameters and the machining conditions, a tool correction means for calculating a tool correction amount, an adder for adding the tool deformation amount and the tool correction amount to a movement command and determining an amount of movement, and an interpolation means for interpolating the amount of movement.

The tool deformation amount calculation means reads the tool deformation parameters such as the rigidity of the tool and the like from the memory, the preprocessing arithmetic operation means reads the machining program and supplies the machining conditions such as a cutting speed and the like necessary for the calculation of the tool deformation amount to the tool deformation amount calculation means, and the tool deformation amount calculation means calculates the tool deformation amount from the tool deformation parameters and machining conditions. Further, the tool correction means determines the tool correction amount, and the tool deformation amount and tool correction amount are added to the movement command to determine the amount of movement interpolated by the interpolation means.

DETAILED DESCRIPTION OF THE PREFERRED EMBODIMENTS

An embodiment of the present invention will be described below with reference to the drawings.

Figure 2:
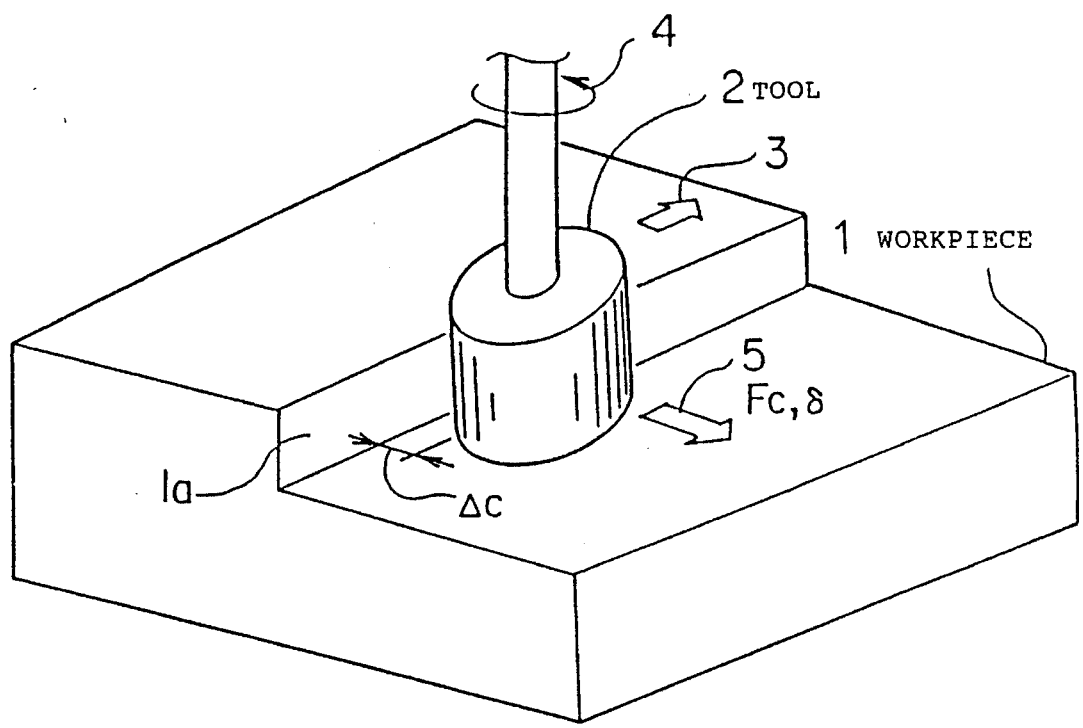
FIG. 2 is a diagram showing the relationship between a tool and a workpiece.

FIG. 2 is a diagram showing the relationship between a tool and a workpiece. A tool 2 machines the machining surface 1a of a workpiece 1, wherein the tool 2 travels in the direction shown by the arrow 3 and rotates in the direction shown by the arrow 4. At this time, the tool 2 is deformed by a deformation amount $\delta$, due to the action thereon of a cutting reaction force Fc, in the direction shown by the arrow 5.

This deformation amount $\delta$ is determined by tool deformation parameters and machining conditions. The tool deformation parameters include the rigidity Ts of the tool 2 and the hardness Wh of the workpiece 1 and the like, and the machining conditions include a cutting depth $\Delta c$, cutting speed f, rpm of a spindle S, and direction of rotation of the spindle Sd (up-cutting or down-cutting) and the like. Fc=($\Delta c$,f,S,Sd)

Therefore, a tool deformation amount is calculated based on these tool deformation parameters and machining conditions. The tool deformation amount can be corrected, thereby obtaining a more accurate machining, by adding the thus determined tool deformation amount to a movement command in the same way as a tool correction amount.

Figure 1:
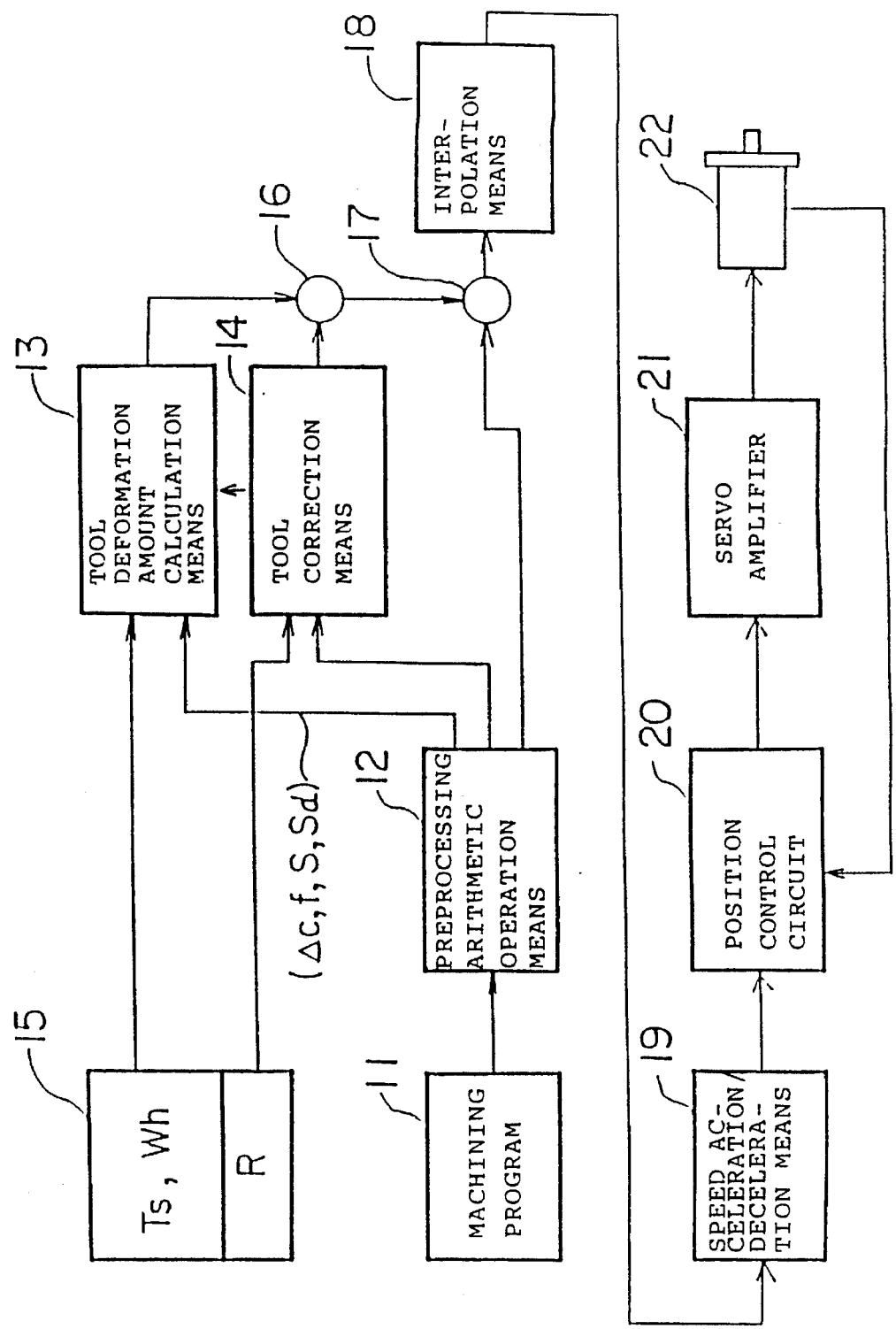
FIG. 1 is a block diagram of a tool deformation amount correction system according to the present invention.

FIG. 1 is a block diagram of a tool deformation amount correction system according to the present invention, wherein a preprocessing arithmetic operation means 12 reads a machining program 11 and supplies the machining conditions including the cutting depth $\Delta c$, cutting speed f, rpm of a spindle S, and direction of rotation of the spindle Sd and the like to a tool deformation amount calculation means 13, which reads the tool deformation parameters including the rigidity Ts of the tool 2 and the hardness Wh of the workpiece 1 and the like, from a memory 15.

The tool deformation amount calculation means 13 calculates the tool deformation amount from these tool deformation parameters and machining conditions.

A calculation formula for determining the tool deformation amount is predetermined by experiment and the like. Further, the calculation formula also can be arranged as a data table in accordance with materials and workpieces.

Further, a tool correction means 14 reads an offset amount R from the memory 15 and determines an offset vector. The tool deformation amount is generally determined as the amount of change of the direction of the offset vector, and as a result, when the offset vector and tool deformation amount are added by an adder 16, an offset vector including the tool deformation amount can be determined.

This offset vector is added to a movement command from the preprocessing arithmetic operation means 12, by the adder 17, and supplied to an interpolation means 18, which interpolates this value and outputs an interpolation pulse.

The output interpolation pulse is accelerated or decelerated by a speed acceleration/deceleration means 19 and supplied to a position control circuit 20, which converts the interpolation pulse to a speed command signal and supplies same to a servo amplifier 21, which amplifies this speed command signal to thereby drive a servo motor 22. The servo motor 22 contains a pulse coder by which a position feedback pulse is fed back to the position control circuit 20.

In FIG. 1, the speed acceleration/deceleration means 19, position control circuit 20, servo amplifier 21 and servo motor 22 are shown as an element for a single axis and the elements for other axes are not shown as these elements have the same arrangement as described above. Further, a spindle amplifier, spindle motor and the like are not shown in FIG. 1.

Although in the above description, the tool deformation amount is calculated as a component in the same direction as that of the offset vector, the tool deformation amount may be determined as an independent tool deformation vector and added to the offset vector.

Note, although the above example is described as a tool deformation amount for a milling cutter used in a machining center or the like, the present invention can be applied in the same way to a cutting tool used in a lathe. In this case, however, the tool correction means determines a tool length as a correction amount, and further, the tool deformation amount is determined as a Z-axis component and Y-axis component (vertical component). The Z-axis component can be corrected in the same way as a usual tool length correction, but the Y-axis component must be corrected by being converted into an X-axis component.

As described above, according to the present invention, since a tool deformation amount is calculated from tool deformation parameters and machining conditions, and then corrected, a machining can be accurately carried out, and thus a trial cutting becomes unnecessary, and accordingly, the machining time can be shortened.

I claim:

1. A system for correcting a tool deformation amount by which the amount of deformation of a tool is corrected for machining, comprising:

a memory which stores tool deformation parameters of a tool used for calculating a tool deformation amount;

preprocessing arithmetic operation means for reading a machining program and outputting machining conditions based on said machining program;

tool deformation amount calculation means for determining the tool deformation amount from said tool deformation parameters and said machining conditions;

tool correction means for calculating a tool correction amount; adder means for adding said tool deformation amount and said tool correction amount to a movement command to determine an amount of tool movement; and interpolation means for interpolating said amount of tool movement.

2. A system for correcting a tool deformation amount according to claim 1, wherein said tool deformation parameters include at least one of a rigidity of a tool and a hardness of a workpiece.

3. A system for correcting a tool deformation amount according to claim 1, wherein said machining conditions include at least one of a cutting depth, a cutting speed, an rpm of a spindle and a direction of rotation of the spindle.

4. A system for correcting a tool deformation amount according to claim 1, wherein said tool is a milling tool and said tool correction means is a tool path correction means.

5. A system for correcting a tool deformation amount according to claim 4, wherein said tool deformation amount is determined as an amount of change of a direction of an offset vector.

6. A system for correcting a tool deformation amount according to claim 1, wherein said tool is a cutting tool and said tool correction means is a tool length correction means.

* * * * *